(12) United States Patent
Guzik et al.

(10) Patent No.: US 11,818,637 B2
(45) Date of Patent: Nov. 14, 2023

(54) PROVIDING ALTERNATE COMMUNICATION PROXIES FOR MEDIA COLLECTION DEVICES

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 120 days.

(21) Appl. No.: 17/344,781

(22) Filed: Jun. 10, 2021

(65) Prior Publication Data

US 2022/0400364 A1 Dec. 15, 2022

(51) Int. Cl.
| | |
|---|---|
| *H04W 4/80* | (2018.01) |
| *H04W 8/18* | (2009.01) |
| *H04W 88/18* | (2009.01) |
| *H04W 76/11* | (2018.01) |
| *H04W 4/02* | (2018.01) |
| *H04W 8/22* | (2009.01) |

(52) U.S. Cl.
CPC ............. *H04W 4/80* (2018.02); *H04W 4/023* (2013.01); *H04W 8/18* (2013.01); *H04W 8/22* (2013.01); *H04W 76/11* (2018.02); *H04W 88/182* (2013.01)

(58) Field of Classification Search
CPC ........... G06T 2207/30232; G06T 7/292; H04L 65/752; H04L 65/765; H04N 7/186; H04N 7/188; H04W 4/023; H04W 4/027; H04W 4/80; H04W 4/90; H04W 4/11; H04W 4/18; H04W 4/22; H04W 4/182
See application file for complete search history.

(56) References Cited

U.S. PATENT DOCUMENTS

| | | | |
|---|---|---|---|
| 2009/0189981 A1* | 7/2009 | Siann ..................... | H04N 7/183 348/143 |
| 2011/0309921 A1* | 12/2011 | Tachibana ............... | H04B 7/14 340/425.1 |
| 2017/0257414 A1* | 9/2017 | Zaletel .................. | H04L 65/764 |

(Continued)

*Primary Examiner* — Awet Haile
(74) *Attorney, Agent, or Firm* — Han Santos, PLLC

(57) ABSTRACT

Described herein are techniques that may be used to facilitate interactions between a media collection device and a remote computing device via the use of a proxy device. Such techniques may comprise establishing a first communication session between a media collection device and a proxy device via a short-range communication channel, transmitting, by the media collection device to the proxy device, status information via the first communication session, at least a portion of the status information subsequently forwarded by the proxy device to a remote computing device, determining that the media collection device is to be activated, upon determining that the media collection device is to be activated, establishing a second communication session between the media collection device and the remote computing device via a long-range communication channel, and transmitting, by the media collection device to the computing device, media content via the second communication session.

20 Claims, 5 Drawing Sheets

(56) References Cited

U.S. PATENT DOCUMENTS

| | | | |
|---|---|---|---|
| 2018/0077437 A1* | 3/2018 | Hansen | H04N 21/4302 |
| 2018/0176500 A1* | 6/2018 | Yokomitsu | H04N 5/232 |
| 2020/0162701 A1* | 5/2020 | Nixon | H04N 7/188 |
| 2020/0336768 A1* | 10/2020 | Chang | H04N 21/234372 |
| 2021/0274444 A1* | 9/2021 | McGill | H04W 52/0241 |

* cited by examiner

PROVIDING ALTERNATE COMMUNICATION PROXIES FOR MEDIA COLLECTION DEVICES

BACKGROUND

In recent years, a number of events have highlighted the need for increased recordkeeping for law enforcement officers. This need pertains to both evidentiary collection as well as protecting the public from potential abuses by a police officer and protecting the police officer from false accusations of abuse. Law enforcement has previously used various camera devices, such as patrol vehicle cameras and body mounted cameras, as a means of reducing liability and documenting evidence.

Body-mounted cameras that connect to a network may be required to periodically ping that network (e.g., a heartbeat) in order to maintain the connection. However, when that network is a long-range communication network (e.g., a cellular network), even that ping can require a significant amount of energy. This can be problematic when a body camera that is designed to be battery operated is used for an extended period of time, as the battery can be drained rather quickly (especially when the body camera is also used to record).

SUMMARY

Techniques are provided herein for facilitating communication interactions between a media collection device and a remote computing device via a proxy device. A media collection device may be a portable electronic device capable of generating media content (e.g., audio content, video content, or imagery) based on collected input. A media collection device may be communicatively coupled to a proxy device via a short-range communication session. The media collection device may transmit information that includes the media content and/or status updates to the proxy device. The proxy device may then forward at least a portion of that information to a remotely-located remote computing device via a long-range communication channel.

The media collection device may become activated while in communication with the proxy device. Upon becoming activated, the media collection device may establish a long-range communication session with the remote computing device. Upon establishing the long-range communication session, the media collection device may transmit information that includes status updates and/or media content directly to the remote computing device over via that communication session.

In one embodiment, a method is disclosed as being performed by a proxy device, the method comprising establishing a first communication session between a media collection device and a proxy device via a short-range communication channel, transmitting, by the media collection device to the proxy device, status information via the first communication session, at least a portion of the status information subsequently forwarded by the proxy device to a remote computing device, determining that the media collection device is to be activated, upon determining that the media collection device is to be activated, establishing a second communication session between the media collection device and the remote computing device via a long-range communication channel, and transmitting, by the media collection device to the computing device, media content via the second communication session.

Another embodiment is directed to a media collection device comprising: a processor; and a memory including instructions that, when executed with the processor, cause the media collection device to establish a first communication session between the media collection device and a proxy device via a short-range communication channel, transmit, to the proxy device, status information via the first communication session, at least a portion of the status information subsequently forwarded by the proxy device to a remote computing device, determine that the media collection device is to be activated, upon determining that the media collection device is to be activated, establish a second communication session between the media collection device and the remote computing device via a long-range communication channel, and transmit media content to the computing device via the second communication session.

Another embodiment is directed to a proxy device comprising a processor; and a memory including instructions that, when executed with the processor, cause the proxy device to, at least: establish at least one communication session with at least one media collection device via a short-range communication channel, receive, via the at least one communication session, information about the at least one media collection device, generate, based on the information about the at least one media collection device, an event associated with the at least one media collection device, identify a set of subscribers associated with the generated event, and provide an indication of the event to each of the subscribers in the set of subscribers.

Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim. The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
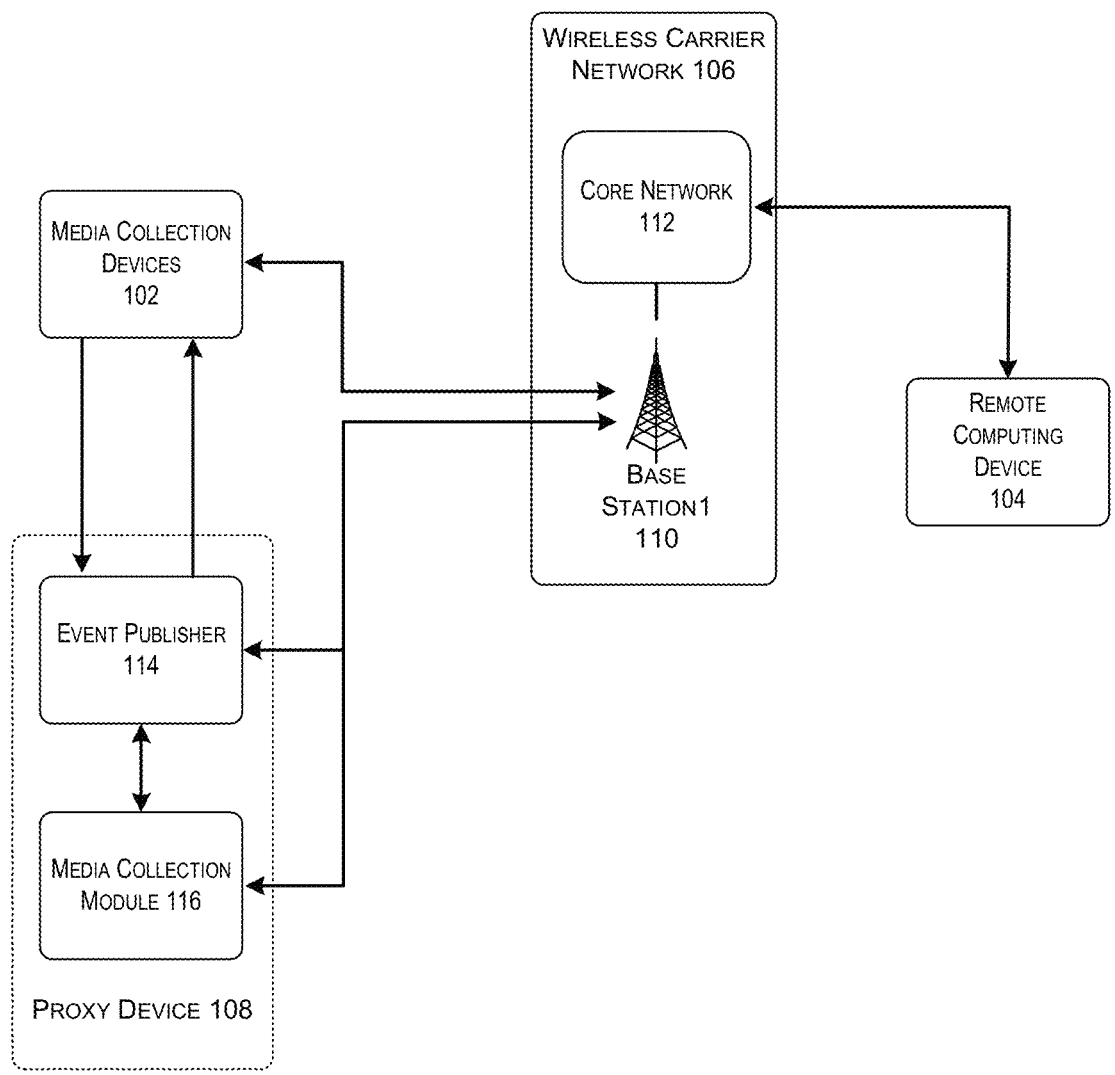
FIG. 1 illustrates an example computing environment configured to provide for optimization of communication routing for media collection devices in accordance with some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques that may be used to facilitate interactions between at least one media collection device and a remote computing device. Such techniques comprise the use of a proxy device to relay media content and/or status updates between the media collection device and the remote computing device. The proxy device may be in communication with a number of media collection devices via a short-range communication channel. A short-range communication channel may be any communication channel that requires relative proximity of the two communicating devices. For example, some short-range communication channels may require that the communicating devices be within 100 meters (m) of each other. Such short-range communication channels may be considered "low power" communication channels, in that the power current consumption requirements for implementing such communication channels may be less than or equal to 50 milliAmps (mA).

Additionally, the proxy device may be in communication with a remote computing device via a long-range communication channel. A long-range communication channel may be any communication channel that is not short-range (e.g., can enable communication over more than 100 m). The proxy device receives information about the one or more media collection devices (e.g., status updates and/or media content) and publishes events based on that information, which are then provided to one or more subscribers (e.g., the remote computing device and/or other media collection devices) of the event subject or event type.

In some embodiments, a media collection device is configured to interact with the proxy device using short-range wireless communications while inactive. Upon entering an active state (e.g., upon receiving instructions from an operator or upon receiving an event publication that warrants activation), the media collection device initiates a communication session directly with the remote computing device over a long-range communication channel (e.g., a wireless carrier network).

Embodiments of the disclosure provide several advantages over conventional techniques. For example, embodiments of the proposed system provide for more efficient use of power by media collection devices. In some conventional systems, each media collection device must provide status updates to a remote computing device, even if that media collection device is not currently recording. However, even periodic status updates (referred to as "heartbeats") may require the use of a long-range communication channel. Such long-range communication, even when periodic, is costly in energy consumption and can quickly drain a power supply. Hence, such conventional systems are not suited to use by operators that need them for extended periods of time, such as law enforcement officers that need the media collection device to remain powered through an entire shift. Unlike such conventional systems, the current system uses a proxy device that maintains short-range communication with the media collection device. Because there is no need to mount a proxy device on a person, the proxy device can be bulkier or heavier than would be convenient for a media collection device that is mounted on a person. Accordingly, the proxy device may include a power source that is more suitable for frequent long-range communication than such a media collection device. In some cases, a proxy device may be mounted within a vehicle and may use that vehicle's power source.

FIG. 1 illustrates a computing environment configured to provide for optimization of communication routing for media collection devices in accordance with some embodiments. In the computing environment 100 depicted in FIG. 1, one or more media collection devices 102 may be in communication with a remote computing device 104. In particular, the one or more media collection devices, when activated, may be configured to transmit media content (e.g., audio, video, and/or imagery) obtained via an input sensor included within the media collection device to the remote computing device for processing. In the computing environment 100, the media collection devices may be configured to interact with a wireless carrier network 106 (e.g., a cellular network). The media collection devices may be further configured to interact with a proxy device 108.

A media collection device 102 may include any electronic device capable of obtaining and transmitting media content. Such a media collection device may include one or more input sensors (e.g., camera, microphone, etc.) capable of collecting media content from an environment surrounding the media collection device. In some embodiments, a media collection device may comprise a portable mounted camera device, such as a body-mounted camera device or vehicle-mounted camera device. The media collection device may include a communication interface having components capable of enabling both short-range and long-range communications.

In some embodiments, a media collection device may be placed in either an active or inactive state. An active state may be a state in which the media collection device is configured to interact with a remote computing device via a long-range communication channel. An inactive state may be a state in which the media collection device is configured to interact with the remote computing device via a short-range communication channel established between the media collection device and a proxy device. In some embodiments, the media collection device may enter an active state when an operator of the media collection device has initiated recording and may enter an inactive state when the operator has stopped recording (or recording has otherwise been deactivated). The media collection device may be configured to periodically transmit status updates to the remote computing device. If the media collection device is currently in an inactive state, it may transmit those status updates to the proxy device instead, to be forwarded to the remote computing device.

In some embodiments, the media collection device may be configured to continuously record regardless of whether it is in an active or inactive state. In these embodiments, media content collected by the media collection device while in an inactive state may be transferred to the proxy device via the short-range communication channel and forwarded to the remote computing device by the proxy device via a long-range communication channel. Additionally, media content collected by the media collection device while in an active state may be transferred to the remote computing device directly via a long-range communication channel (e.g., wireless carrier network 106).

A remote computing device 104 may include any computing device, or combination of computing devices, configured to receive media content from one or more media collection devices. Remote computing device 104 can include one or more virtual machines running virtual operating systems, or other computing architectures involving virtualization such as one or more flexible pools of logical storage devices that can be virtualized to maintain virtual storage devices for the computer.

A wireless carrier network 106 may include any combination of computing devices configured to provide long-range communication capabilities to one or more electronic devices. In some embodiments, a wireless carrier network may be a cellular network that includes a number of geographically-distributed base stations 110, each of which is in communication with a core network 112 that manages communication sessions established via those base stations. In some embodiments, the core network 112 may establish communication with one or more external computing devices (e.g., a remote computing device) via an external network (e.g., the Internet). In some embodiments, the wireless carrier network 106 may be configured to route communications between the media collection devices and the remote computing device by establishing a wireless communication session with the media collection device and an internet communication session with the remote computing device.

The proxy device 108 may include an electronic device configured to perform at least a portion of the functionality described herein. Such a proxy device may be configured to facilitate communications between one or more media collection devices and the remote computing device (e.g., via a communication channel established over a wireless carrier network). In some embodiments, the proxy device may include various components (either hardware or software) that enable the proxy device to perform the functions described herein. For example, the proxy device may include at least an event publisher 114 and a media collection module 116. An event publisher may be any component configured to detect events (e.g., an activation of a media collection device, etc.) and publish the detected event to one or more event subscribers. A subscriber for an event is any entity determined to currently have a subscriber relationship with the media collection device for which the event has been generated. A media collection module may be any suitable component capable of storing and/or managing media content received from a media collection device. Such media content may be received from a media collection device via a short-range communication channel.

In some embodiments, events may be generated based on information received from one or more media collection devices. For example, upon receiving an indication that one of the media collection devices has been activated (e.g., recording has begun), an activation event may be generated that specifies the media collection device from which the indication was received. The generated event may then be published to one or more subscribers of that event. An entity may be determined to be a subscriber of an event based on attributes of the media collection device and/or of the potential subscriber. In some cases, a computing device may be determined to be a subscriber to the event if a specified relationship exists between the potential subscriber and the media collection device. For example, a determination may be made that the media collection device is in a geographic proximity (e.g., within a threshold distance) of at least one other media collection device. In some embodiments, a subscriber may take one or more actions upon receiving a publication of an event.

By way of illustrating subscriber relationships, consider an example in which two media collection devices are determined to share a proximate relationship (e.g., the media collection devices are within a threshold distance). Based on such a proximate relationship, each of the media collection devices may be made a subscriber of specified events that are generated with respect to the other. Continuing with this example, a first media collection device of the two may be subscribed to activation events of the second of the media collection devices. In this example, upon activation of the second of the media collection devices by its operator, the proxy device may publish an activation event to the first of the media collection devices. The first of the media collection devices may then be activated automatically (e.g., without operator interaction).

In some embodiments, the proxy device may collect and store media content received from one or more media collection devices. Such media content may comprise audio, video, and/or imagery data. In some embodiments, the proxy device may forward or relay the media content to the remote computing device. In some cases, the proxy device may perform processing on the media content. For example, the proxy device may perform one or more object recognition techniques on the media content to identify objects depicted within that media content. In some embodiments, events may be generated based on objects identified within the media content. For example, upon performing object recognition, the proxy device may identify a data pattern matching a weapon (e.g., a gun or knife). Upon identifying such a weapon, the proxy device may generate a weapon detection event.

The proxy device may be in communication with both the remote computing device 104 as well as a number of media collection devices 102. In some embodiments, the proxy device may be in communication with a remote computing device via a long-range communication channel established over a wireless carrier network as well with a number of media collection devices (or other suitable electronic devices) via one or more short-range communication channels. In these embodiments, the proxy device may receive media content and/or status updates from the media collection devices over the short-range communication channel and may relay the media content and/or status updates to the remote computing device via the long-range communication channel.

For purposes of illustrating interactions between one or more of the components of the computing environment, consider a first scenario in which a media collection device is a body-mounted camera being operated by a law enforcement officer on patrol. In this scenario, the media collection device may initially be providing status updates to a proxy device mounted within a patrol vehicle. The officer in this scenario may activate the media collection device to capture video in relation to an incident. Upon activation, the media collection device may report its activation to the proxy device via a short-range communication channel. Additionally, the media collection device may establish a long-range communication session with the remote computing device at this time (e.g., via the wireless carrier network). The media collection device may begin to collect media content and may transmit the collected media content to the remote computing device over the established long-range communication channel.

Continuing with the above scenario, the proxy device receives the report of its activation and generates an activation event with respect to that media collection device. The proxy device then publishes that event to subscriber devices. In this scenario, assume that a second law enforcement officer is in the vicinity of the media collection device. The published event may be transmitted to a second body-mounted camera device being worn by the second law enforcement officer. Upon receiving the published event, the second media collection device may be activated to obtain media content without receiving any instructions from the second law enforcement officer.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
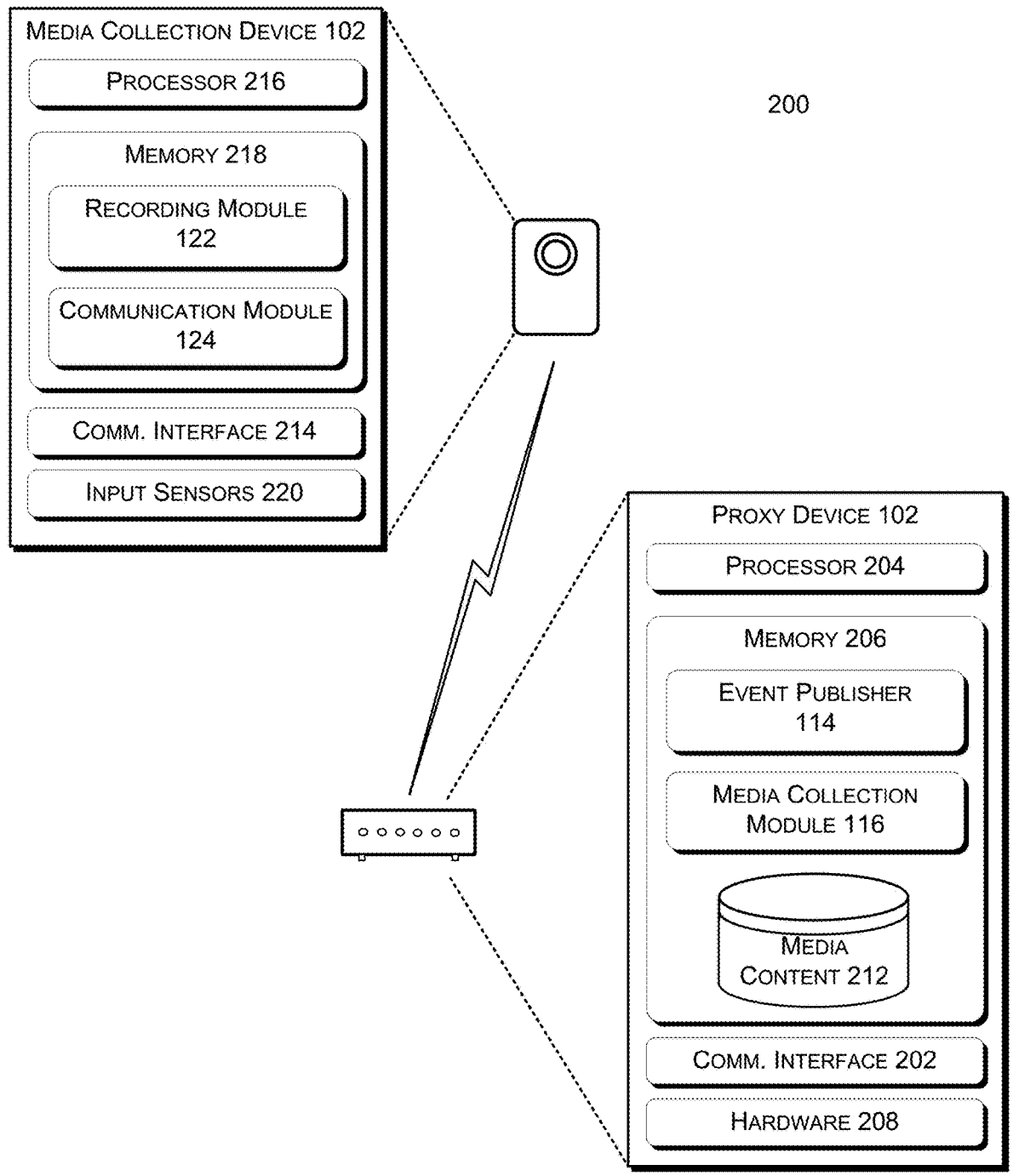
FIG. 2 is a block diagram showing various components of an example computing system architecture that supports providing alternative communication proxies for media collection devices in accordance with some embodiments.

FIG. 2 is a block diagram showing various components of a computing system architecture that supports providing alternative communication proxies for media collection devices in accordance with some embodiments. The system architecture 200 may include a proxy device 108 and at least one media collection device 102.

The proxy device 108 may include a communication interface 202, one or more processors 204, memory 206, and hardware 208. The communication interface 202 may include wireless and/or wired communication components that enable the proxy device 108 to transmit data to, and receive data from, other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The proxy device 108 can include any computing device or combination of computing devices configured to perform at least a portion of the operations described herein. The proxy device 108 may be composed of one or more general purpose computing devices or specialized computing devices. In some embodiments, the proxy device 108 may be configured to be mounted within a vehicle and to draw power from the vehicle's power source.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the proxy device 108 may implement functionality from one or more software modules and data stores. Such software modules may include routines, program instructions, objects, and/or data structures that are executed by the processors 204 to perform particular tasks or implement particular data types. The memory 206 may include at least a module for generating and publishing events (e.g., event publisher 114) as well as a module for receiving and managing media content (e.g., media collection module 116). Additionally, the memory 206 may further maintain a data store of media content received from one or more media collection devices (e.g., media content 212).

The event publisher 114 may be configured to, in conjunction with the processor 204, generate and publish events. Events may be generated with respect to one or more media collection devices based on information received from/about the media collection device. In some cases, an event may be generated based on instructions received from an operator (e.g., of the media collection device or the proxy device). For example, an operator may initiate an activation of the media collection device (e.g., by pressing a record button). In some cases, an event may be generated based on information received from one or more sensors of the media collection device. For example, sensor data may be received from one or more sensors of the media collection device (e.g., accelerometers or other sensors) that indicates that the media collection device is moving. In this example, data patterns may be identified within the sensor data that match particular types of actions (e.g., running, walking, laying down, etc.). An event may then be generated based on the identified action.

Once an event has been generated, that event may be published to any subscribers of the event. In some embodiments, an entity may be a subscriber of events that involve specified actions. In some embodiments, an entity may be a subscriber of events generated with respect to specific media collection devices. In some embodiments, an entity may be determined to be a subscriber based on its relationship with a subject of the event (e.g., a media collection device). For example, a determination may be made that an entity is proximate to (e.g., within a threshold distance of) the media collection device for which the event has been generated. In this example, the entity may be determined to be a subscriber of the event based on its proximity. In another example, a determination of a subscriber may be made based on a relationship between operators of different devices. By way of illustration, each of two media collection devices that are being worn by law enforcement officers may be determined to be subscribers of events from the other respective media collection device if the two law enforcement officers are partners. In this example, events generated with respect to the media collection device of one of the law enforcement officers may be published to the other media collection device operated by his or her partner.

The media collection module 116 may be configured to, in conjunction with the processor 204, manage the collection of media content from one or more media collection devices. In some embodiments, the media collection module may be configured to identify a recipient of the media content (e.g., a remote computing device) and forward the media content to the identified recipient via a communication session established over a long-range communication channel. In some embodiments, the media collection module may perform object recognition or other suitable machine vision techniques to determine attributes of the media content (e.g., objects depicted in the media content, actions depicted as being performed within the media content, etc.). The media collection module may maintain an indication of determined attributes with respect to a piece of media content. In some cases, the media collection module may provide an indication of the determined attributes to the recipient along with the media content.

The communication interface 202 may include wireless and/or wired communication components that enable the proxy device to transmit or receive data via a network, such as the Internet, to a number of other electronic devices (e.g., data source 106). Such a communication interface 202 may include access to both wired and wireless communication mechanisms. In some cases, the proxy device transmits data to other electronic devices over either a short-range communication channel (e.g., Bluetooth®, WiFi, etc.) or a long-range communication channel, such as a data communication channel of a wireless carrier network that uses a mobile communications standard (e.g., long-term evolution (LTE)). The proxy device may communicate with other electronic devices via some combination of short-range and long-range communication channels. For example, the proxy device may use short-range communication channels to communicate with one or more media collection devices and may use long-range communication channels (e.g., a wireless carrier network) to communicate with a remote computing device.

As noted above, the proxy device may be in communication with at least one media collection device 102. A media collection device 102 may include a communication interface 214, one or more processors 216, memory 218, and one or more input sensors 220. The communication interface 214 may include wireless and/or wired communication components that enable the media collection device to transmit data to, and receive data from, other networked devices. Similar to the communication interface 202 of the proxy device, the communication interface may include both short-range communication channels and long-range communication channels. In some embodiments, during a first state (e.g., an inactive state), the media collection device may provide information such as status updates and/or media content to the proxy device via a short-range communication channel. At least a portion of this information may be forwarded by the proxy device to a remote computing device. During a second state (e.g., an active state), the media collection device may be configured to establish a communication session directly with the remote computing device via a long-range communication channel. The media collection device may then provide information directly to the remote computing device via that communication session. In some cases, the media collection device may continue to provide information to the proxy device while transmitting directly to the remote computing device.

Input sensors 220 included within the media collection device may include any electronic component capable of collecting information about the media collection device or about an environment in which the media collection device is situated. Such input sensors may include both media collection sensors and status or positional sensors. Media collection sensors may include any sensor device capable of collecting media content. Some nonlimiting examples of such media collection sensors may include microphones and/or cameras. Positional sensors may include sensors such as a temperature sensor, a real-time clock (RTC), an inertial measurement unit (IMU), or any other suitable sensor. An IMU may be any electronic device that measures and reports a body's specific force, angular rate, and sometimes the orientation of the body, using a combination of accelerometers, gyroscopes, and magnetometers.

The media collection device may further include an additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices. In some embodiments, the media collection device includes a display or other suitable output device capable of allowing playback of collected media content.

The memory 218 may be implemented using computer-readable media, such as computer storage media. The one or more processors 216 and the memory 218 of the media collection device 102 may implement functionality from one or more software modules and data stores. Such software modules may include routines, program instructions, objects, and/or data structures that are executed by the processors 216 to perform particular tasks or implement particular data types. The memory 218 may include at least a module for generating media content (e.g., recording module 122) as well as a module for managing communication with other electronic devices (e.g., communication module 124).

The recording module 122 may be configured to, in conjunction with the processor 216, manage media content collected via the input sensors. In some cases, this comprises selecting information to be used from raw image data and formatting collected media into a standardized format. In some embodiments, the media collection device may perform one or more object recognition techniques to identify objects depicted within the collected media content. The media collection device may provide information about one or more identified objects to another computing device, such as the proxy device or the remote computing device.

The communication module 124 may be configured to, in conjunction with the processor 216, manage communication sessions between itself and one or more other electronic devices. In some embodiments, the communication module may be configured to constantly maintain an active communication session between the media collection device and at least one proxy device over a short-range communication channel, regardless of a state or status of the media collection device. The communication module may be further configured to establish a communication session with a remote computing device over a long-range communication channel upon determining that the media collection device has been activated. Media content collected by the media collection device may be transmitted over that long-range communication channel upon it being established.

In some embodiments, the media collection device may be configured to receive an indication of events published by the proxy device. For example, the media collection device may be a subscriber to specified events/event types. In these embodiments, the media collection device may be configured to perform one or more actions upon receiving an indication of a particular event. For example, upon receiving at a first media collection device an indication that a second media collection device has begun recording, the first media collection device may automatically being recording as well (e.g., without any interaction by the operator of that device).

Figure 3:
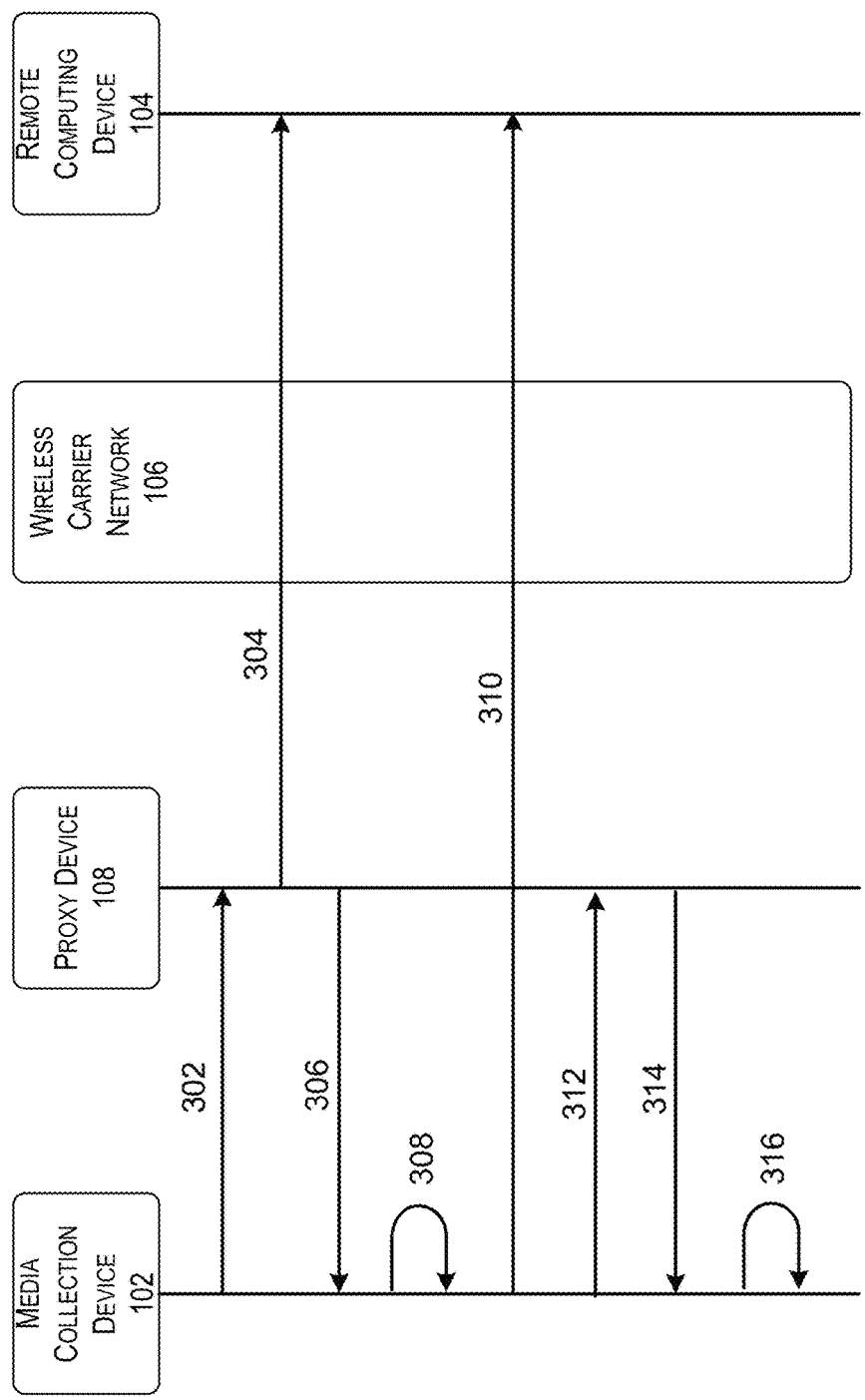
FIG. 3 depicts a block diagram showing an example process flow for correlating media data with events in accordance with some embodiments.

FIG. 3 depicts a block diagram showing an example process flow for correlating media data with events in accordance with embodiments. The process 300 involves interactions between various components of the architecture 100 described with respect to FIG. 1. More particularly, the process 300 involves interactions between at least a media collection device 102, a proxy device 108, a wireless carrier network 106, and a remote computing device 104.

At 302 of the process 300, a media collection device may establish a communication session with a proxy device. In some cases, the media collection device may establish the communication session automatically (e.g., without user interaction) upon detecting the presence of the proxy device. For example, the media collection device may perform a device discovery process and may automatically connect to the proxy device upon detecting its device identifier. In this example, an enrollment process may be performed prior to this step in order to establish a trusted relationship between the proxy device and the media collection device. The communication session established at 302 is established via a short-range communication channel. Some nonlimiting examples of short-range communication channels may include communication channels that use Bluetooth®, WiFi, Infrared, or any other suitable short-range communication means. The communication session may be initiated by the media collection device (e.g., upon detecting the proxy device) or it may be initiated by the proxy device (e.g., upon the proxy device detecting the media collection device). The media collection device may provide update statuses (e.g., "heartbeats") to the proxy device. In some cases, the media collection device may transmit collected media content to the proxy device.

In some embodiments, upon the establishment of the communication session at 302, the proxy device may assign the media collection device as a subscriber to one or more events published by that proxy device. In some cases, this assignment may be made based on characteristics of the media collection device. In some cases, the proxy device may be in communication with multiple media collection devices via short-range communication sessions. In such cases, each of the multiple media collection devices may be determined to have a proximate relationship by virtue of each being within communication range of the proxy device. Based on this proximate relationship, each of the multiple media collection devices may be assigned as a subscriber to specified events generated with respect to each of the other media collection devices.

The proxy device may maintain a communication session between itself and a remote computing device having been established via a long-range communication channel (e.g., over a wireless carrier network). Upon receiving information that includes status updates and/or media content from the media collection device, the proxy device may forward at least a portion of that information to the remote computing device at 304 over the long-range communication channel.

In some embodiments, the media collection device may receive an indication of a published event from the proxy device at 306 of the process 300. For example, the proxy device may report an activation event generated for another media collection device in the vicinity of the media collection device 102.

In some embodiments, the media collection device may continuously collect media content and may provide that media content to the proxy device. As described above, the proxy device may forward that media content to the remote computing device (e.g., at 304). In some cases, the proxy device may perform one or more object recognition techniques to identify one or more objects within the collected media content. Upon detecting a specified object or type of object (e.g., a weapon), the proxy device may be configured to generate an activation event to be transmitted to the media collection device.

At 308 of the process 300, the media collection device may determine that the media collection device is to be activated. In some embodiments, such a determination may be made upon receiving an instruction from an operator of the media collection device. For example, the operator of the media collection device may press a button (e.g., a "record" button) or other suitable activation mechanism on the media collection device. In some embodiments, the media collection device may determine that it is to be activated based on an indication of a published event received from the proxy device at 306. For example, upon receiving an indication that another media collection device in communication with the proxy device has been activated, the media collection device may activate as well. In some embodiments, the media collection device may be activated upon determining that the proxy device is no longer within communication range. For example, each time that the media collection device comes within communication range of the proxy device, it may suspend long-range communication in favor of short-range communication with the proxy device. When the media collection device is no longer within range of the proxy device, the media collection device may reestablish long rang communication.

In some embodiments, the media collection device may include a number of sensors that are configured to obtain information about the media collection device and/or an environment in which the media collection device is located. In these embodiments, a determination that the media collection device is to be activated may be made based on data collected by the one or more sensors. For example, upon detecting an increase in movement/acceleration, the media collection device may be activated. In some embodiments, one or more pattern recognition techniques may be employed to identify data patterns that match particular scenarios. For example, data pattern matching may be used to detect a scenario in which the operator of the media collection device is running or a scenario in which the operator of the media collection device becomes prone. A determination may be made to activate the media collection device upon detecting one or more scenarios using data pattern recognition.

At 310 of the process 300, the media collection device may establish a long-range communication session with the remote computing device (e.g., via a wireless carrier network). The media collection device may then begin to transmit media content that it collects directly to the remote computing device via that communication session. In some embodiments, the media collection device may continue to provide information to the proxy device as depicted at 312 even while in communication with the remote computing device.

The media collection device may continue to receive an indication of a published events from the proxy device at 314 of the process 300. For example, the proxy device may report a deactivation event generated for another media collection device in the vicinity of the media collection device 102.

At 316 of the process 300, the media collection device may determine that the media collection device is to be deactivated. In some embodiments, such a determination may be made upon receiving an instruction from an operator of the media collection device. For example, the operator of the media collection device may press a button (e.g., a "stop" button) or other suitable deactivation mechanism on the media collection device. In some embodiments, the media collection device may determine that it is to be deactivated based on an indication of a published event received from the proxy device at 314. For example, upon receiving an indication that another media collection device in communication with the proxy device has been deactivated, the media collection device may be deactivated as well.

Figure 4:
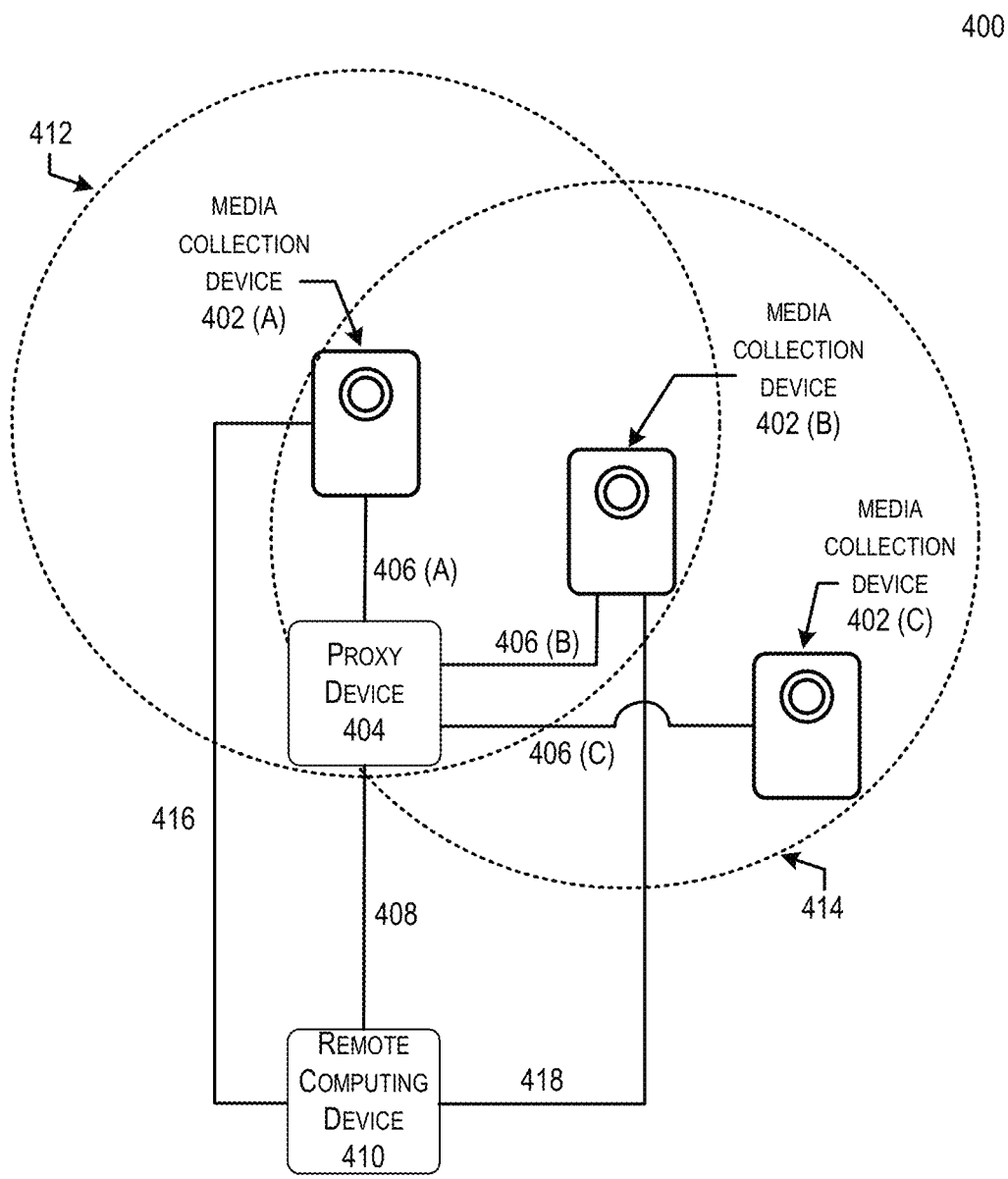
FIG. 4 depicts an example of interactions that may occur between a number of media collection devices and a proxy device in accordance with some embodiments.

FIG. 4 depicts an illustrative example of interactions that may occur between a number of media collection devices and a proxy device in accordance with embodiments. In FIG. 4, a number of media collection devices 402 (A-C) may establish communication with a proxy device 404. In this example, each of the media collection devices may establish a respective communication session 406 (A-C) with the proxy device upon detecting that it is within communication range (e.g., via a device discovery process).

In this example, the proxy device 404 may maintain separate short-range communication sessions 406 with each of the media collection devices as well as a long-range communication session 408 with the remote computing device 410. Information may be received from one or more media collection devices at the proxy device and forwarded to the remote computing device. Such information may include status updates and/or media content. As described above, the proxy device may generate and publish events based on information received from one or more of the media collection devices. Such events may be published to any subscriber of conditions that are met by the generated event. Each of the media collection devices as well as the remote computing device may be a subscriber to specific events.

Each of the media collection devices may subscribe to a different set of events or event types. In some embodiments, a subscriber may identify entities (e.g., media collection devices) to which they should be subscribed to. In some embodiments, a media collection device may perform a device discovery process to identify other electronic devices (e.g., other media collection devices) within a proximity 410 of that media collection device. This may comprise activating a short-range wireless communication channel and identifying each of the other electronic devices within range of that media collection device. In this example, the proximity 412 of the media collection device may be limited by a range of the short-range communication channel. Upon detecting an electronic device within communication range, the media collection device may provide an identifier for the detected electronic device to the proxy device in order to be subscribed to events generated with respect to that electronic device. It should be noted that because this technique involves the identification of proximate devices based on a range of the communication channel, even when a set of multiple media collection devices are in communication with a single proxy device, each of those media collection devices may be subscribed to events for a different subset of that set. By way of illustration, media collection device 402 (A) may be subscribed to events generated with respect to media collection device 402 (B) based on its proximity 412. However, media collection device 402 (B) may be subscribed to events generated with respect to both media collection device 402 (A) as well as media collection device 402 (C) based on its proximity 414 to each of those devices.

In some embodiments, a media collection device may be activated upon receiving an indication of an event generated by the proxy device. For example, a media collection device may be activated upon receiving an indication that another media collection device to which it is subscribed has been activated. By way of illustration, in the scenario described above, media collection device 402 (A) may become activated upon detecting that media collection device 402 (B) has been activated. Likewise, media collection device 402 (B) may become activated upon detecting that either media collection device 402 (A) or media collection device 402 (C) has been activated.

Figure 5:
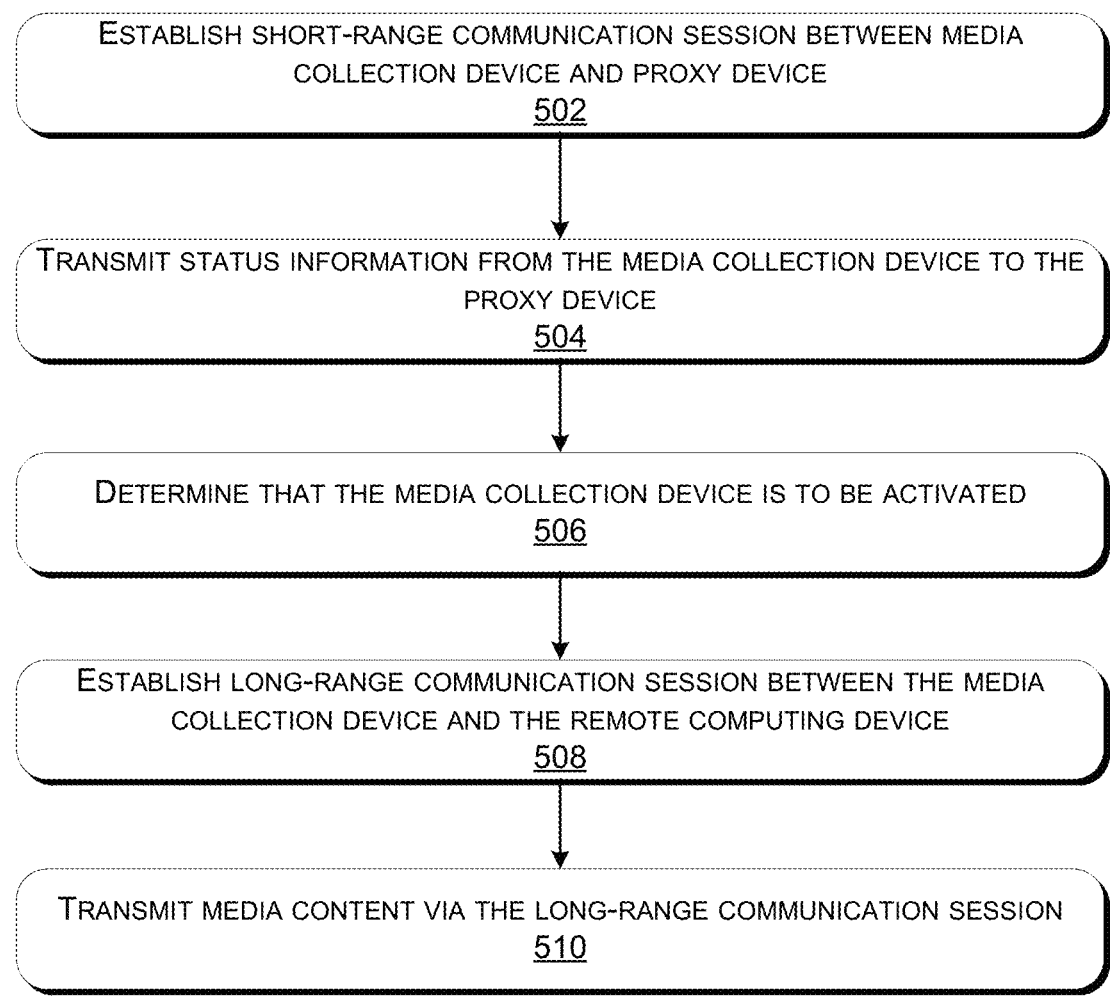
FIG. 5 depicts a block diagram showing an example process flow for managing communication sessions for a media collection device in accordance with some embodiments.

FIG. 5 depicts a block diagram showing an example process flow for managing communication sessions for a media collection device in accordance with embodiments. The process 500 may be performed by components within a system 100 as discussed with respect to FIG. 1 above. For example, the process 500 may be performed by a media collection device 102 in communication with a proxy device 108 and a remote computing device 104.

At 502, the process 500 comprises establishing communication sessions between at least one media collection device and a proxy device via a short-range communication channel. In some embodiments, the communication sessions between the at least one media collection device and the proxy device are established upon the at least one media collection device entering within communicative range of the proxy device. In some cases, the media collection device is determined to have entered within communicative range of the proxy device via a device discovery process. In some embodiments, one or more media collection device is assigned to the proxy device, such that the one or more media collection device will connect to the proxy device even when other proxy devices are available. In some embodiments, such an assignment may be made based on an operator of the media collection device. For example, a media collection device associated with a particular operator may be assigned to a proxy device associated with that same operator.

At 504, the process 500 comprises transmitting status information from a media collection device to the proxy device via the short-range communication session. In some embodiments, the status information comprises at least one of a status update or media content. For example, the status information may include an indication of a current status of the media collection device. In this example, the status information may include a current location of the media collection device (e.g., GPS coordinates), a battery life, movement data, or any other suitable information.

At least a portion of the status information is forwarded to a remote computing device by the proxy device. The proxy device may maintain an active communication session between itself and the remote computing device via a long-range communication channel. In some embodiments, the proxy device may generate an event associated with the media collection device based on the received status information and publish that event to one or more subscribers. In these embodiments, the remote computing device may be a subscriber of events associated with the media collection device.

At 506, the process 500 comprises determining that the media collection device is to be activated (i.e., placed in an active status). In some cases, the media collection device is determined to be activated based on input received from an operator of the media collection device. In some cases, the media collection device is determined to be activated based on information indicated in an event received by the media collection device from the proxy device. For example, the information indicated in the event may include an activation of a second media collection device determined to be proximate to the media collection device. In this example, the media collection device may be activated automatically any time that a proximate media collection device is activated. It should be noted that a determination that a media collection device is to enter an active status may be made either at the proxy device or by the media collection device itself. Upon such a determination being made by the proxy device, the proxy device may provide instructions to the media collection device to enter an active status and the media collection device may make a determination to enter the active status upon receiving those instructions.

In some embodiments, media collection devices may be determined to be proximate based on coordinates received from each of those media collection devices. In some embodiments, media collection devices may be determined to be proximate based on a performed device discovery process. For example, one of the media collection devices may perform a device discovery process using a short-range communication channel. In this example, the media collection device may discover a device identifier for the second media collection device, which is then used to determine proximity.

At 508, the process 500 comprises establishing a second communication session between the media collection device and the remote computing device via a long-range communication channel. In some embodiments, the long-range communication channel comprises a cellular network.

At 510, the process 500 comprises transmitting media content from the media collection device to the remote computing device via the long-range communication session. In some embodiments, such media content comprises one or more of audio data, video data, or imagery collected by the media collection device.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method comprising:
   establishing a first communication session between a media collection device and a proxy device via a short-range communication channel;
   transmitting, by the media collection device to the proxy device, status information via the first communication session, at least a portion of the status information subsequently forwarded by the proxy device to a remote computing device;
   determining, by the proxy device, that the media collection device is to be activated when the proxy device receives information from a second media collection device indicating that the second media collection device is activated;
   upon the proxy device determining that the media collection device is to be activated, providing instructions from the proxy device to the media collection device that direct the media collection device to establish a second communication session between the media collection device and the remote computing device via a long-range communication channel, wherein the long-range communication channel is established via a wireless carrier network; and
   transmitting, by the media collection device to the remote computing device, media content via the second communication session.

2. The method of claim 1, wherein the status information comprises at least one of a status update or media content.

3. The method of claim 1, wherein the second media collection device is activated based on input received from an operator of the second media collection device.

4. The method of claim 1, wherein the second media collection device is activated to capture additional media content in relationship to an incident.

5. The method of claim 1, wherein the instructions further cause the media collection device to capture the media content.

6. The method of claim 5, wherein the second media collection device is determined to be proximate to the media collection device.

7. The method of claim 6, wherein the second media collection device is determined to be proximate to the media collection device based on coordinates received from each of the media collection device and the second media collection device.

8. The method of claim 6, wherein the second media collection device is determined to be proximate to the media collection device based on a performed device discovery process.

9. A proxy device comprising:
   a processor; and
   a memory including instructions that, when executed with the processor, cause the proxy device to, at least:
      establish a first communication session between a media collection device and the proxy device via a short-range communication channel;
      receive, at the proxy device, status information via the first communication session, at least a portion of the status information subsequently forwarded by the proxy device to a remote computing device;
      determine, by the proxy device, that the media collection device is to be placed into an active status when the proxy device receives information from a second media collection device indicating that the second media collection device is activated; and
      upon the proxy device determining that the media collection device is to be placed into an active status, providing instructions from the proxy device to the media collection device that direct the media collection device to establish a second communication session between the media collection device and the remote computing device via a long-range communication channel,
      wherein media content is transmitted by the media collection device to the remote computing device via the second communication session.

10. The proxy device of claim 9, wherein the first communication session between the media collection device and the proxy device are established upon the media collection device entering within communicative range of the proxy device.

11. The proxy device of claim 10, wherein the media collection device is determined to have entered within communicative range of the proxy device via a device discovery process.

12. The proxy device of claim 9, wherein the media collection device is assigned to the proxy device.

13. The proxy device of claim 12, wherein the media collection device is assigned to the proxy device based on each of the media collection device and the proxy device being associated with an operator.

14. The proxy device of claim 9, wherein the long-range communication channel comprises a cellular network.

15. The proxy device of claim 9, wherein the media content comprises one or more of audio data, video data, or imagery collected by the media collection device.

16. The proxy device of claim 9, wherein the status information comprises a current location of the media collection device, a battery life, or movement data.

17. One or more non-transitory computer-readable media storing computer-executable instructions that upon execution cause one or more processors to perform acts comprising:

establishing a first communication session between a media collection device and a proxy device via a short-range communication channel;

transmitting, by the media collection device to the proxy device, status information via the first communication session, at least a portion of the status information subsequently forwarded by the proxy device to a remote computing device;

determining, by the proxy device, that the media collection device is to be activated when the proxy device receives information from a second media collection device indicating that the second media collection device is activated;

upon the proxy device determining that the media collection device is to be activated, providing instructions from the proxy device to the media collection device that direct the media collection device to establish a second communication session between the media collection device and the remote computing device via a long-range communication channel, wherein the long-range communication channel is established via a wireless carrier network; and transmitting, by the media collection device to the remote computing device, media content via the second communication session.

18. The one or more non-transitory computer-readable media of claim 7, wherein the status information comprises at least one of a status update or media content.

19. The one or more non-transitory computer-readable media of claim 17, wherein the second media collection device is activated based on input received from an operator of the second media collection device.

20. The one or more non-transitory computer-readable media of claim 17, wherein the second media collection device is activated to capture additional media content in relationship to an incident.

\* \* \* \* \*